United States Patent
Kang et al.

(10) Patent No.: US 12,309,749 B2
(45) Date of Patent: May 20, 2025

(54) COMMUNICATION APPARATUSES AND COMMUNICATION METHODS FOR UTILIZATION OF SL-RSRP IN V2X RESOURCE SENSING AND SELECTION

(71) Applicant: Panasonic Intellectual Property Corporation of America, Torrance, CA (US)

(72) Inventors: Yang Kang, Singapore (SG); Hidetoshi Suzuki, Kanagawa (JP); Naoya Shibaike, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 463 days.

(21) Appl. No.: 17/764,496

(22) PCT Filed: Jul. 9, 2020

(86) PCT No.: PCT/SG2020/050394
§ 371 (c)(1),
(2) Date: Mar. 28, 2022

(87) PCT Pub. No.: WO2021/066741
PCT Pub. Date: Apr. 8, 2021

(65) Prior Publication Data
US 2022/0369290 A1    Nov. 17, 2022

(30) Foreign Application Priority Data
Oct. 4, 2019 (SG) ............................ 10201909315Q

(51) Int. Cl.
*H04W 72/02* (2009.01)

(52) U.S. Cl.
CPC .................................. *H04W 72/02* (2013.01)

(58) Field of Classification Search
CPC ............................ H04W 72/02; H04W 72/569
See application file for complete search history.

(56) References Cited

U.S. PATENT DOCUMENTS

| 11,026,120 B2* | 6/2021 | Khoryaev | ............. H04L 5/0042 |
| 11,570,593 B2* | 1/2023 | Bharadwaj | ............ H04L 5/0094 |

(Continued)

FOREIGN PATENT DOCUMENTS

| WO | 2018030306 A1 | 2/2018 |
| WO | 2018/174630 A1 | 9/2018 |

(Continued)

OTHER PUBLICATIONS

3GPP, "3rd Generation Partnership Project; Technical Specification Group Radio Access Network; NR; NR and NG-RAN Overall Description; Stage 2 (Release 15)," 3GPP TS 38.300 V15.6.0, Jun. 2019 (99 pages).

(Continued)

*Primary Examiner* — Jael M Ulysse
(74) *Attorney, Agent, or Firm* — Seed IP Law Group LLP

(57) ABSTRACT

The present disclosure provides communication apparatuses and communication methods for utilization of SL-RSRP in V2X resource sensing and selection. The communication apparatuses include a communication apparatus comprising: circuitry which, in operation, adjusts a parameter based on at least one of a plurality of priority levels, and determines a plurality of resource candidates based on the adjusted parameter; and a transmitter which, in operation, transmits a transmission block (TB) using a resource selected from the plurality of resource candidates.

15 Claims, 12 Drawing Sheets

(56) References Cited

U.S. PATENT DOCUMENTS

| | | | | |
|---|---|---|---|---|
| 11,570,754 B2* | 1/2023 | Freda | | H04L 5/0091 |
| 11,723,046 B2* | 8/2023 | Li | | H04L 5/0094 |
| | | | | 370/329 |
| 2009/0111506 A1* | 4/2009 | Laroia | | H04W 52/267 |
| | | | | 455/550.1 |
| 2011/0300892 A1* | 12/2011 | Hakola | | H04W 72/542 |
| | | | | 455/512 |
| 2012/0064935 A1* | 3/2012 | Hakola | | H04W 72/02 |
| | | | | 455/513 |
| 2015/0215903 A1* | 7/2015 | Zhao | | H04W 72/02 |
| | | | | 370/329 |
| 2016/0142898 A1* | 5/2016 | Poitau | | H04W 8/005 |
| | | | | 370/329 |
| 2016/0278003 A1* | 9/2016 | Kim | | H04W 72/0446 |
| 2018/0254842 A1* | 9/2018 | Hua | | H04W 52/243 |
| 2019/0075548 A1* | 3/2019 | Lee | | H04W 4/40 |
| 2019/0090250 A1* | 3/2019 | Lee | | H04W 72/02 |
| 2019/0116475 A1* | 4/2019 | Lee | | H04W 72/542 |
| 2019/0174503 A1 | 6/2019 | Adachi et al. | | |
| 2019/0191461 A1* | 6/2019 | Lee | | H04W 74/0816 |
| 2019/0357033 A1* | 11/2019 | Cheng | | H04W 16/02 |
| 2019/0394786 A1* | 12/2019 | Parron | | H04W 4/46 |
| 2020/0015176 A1* | 1/2020 | Li | | H04L 1/1861 |
| 2020/0029245 A1* | 1/2020 | Khoryaev | | H04W 36/22 |
| 2020/0037358 A1* | 1/2020 | Chae | | H04W 72/54 |
| 2020/0045715 A1* | 2/2020 | Li | | H04W 72/1263 |
| 2020/0112400 A1* | 4/2020 | Lee | | H04L 1/1819 |
| 2020/0128569 A1* | 4/2020 | Hassan Hussein | ... | H04L 5/0053 |
| 2020/0214002 A1* | 7/2020 | Lee | | H04B 17/318 |
| 2020/0229210 A1* | 7/2020 | Bharadwaj | | H04L 5/0044 |
| 2020/0280961 A1* | 9/2020 | Lee | | H04W 4/40 |
| 2020/0288432 A1* | 9/2020 | Min | | H04W 4/40 |
| 2020/0295883 A1* | 9/2020 | Lee | | H04L 5/0057 |
| 2020/0296690 A1* | 9/2020 | Lee | | H04W 4/40 |
| 2020/0304272 A1* | 9/2020 | Lee | | H04L 5/0064 |
| 2020/0314804 A1* | 10/2020 | Shin | | H04L 5/0055 |
| 2020/0351057 A1* | 11/2020 | Yeo | | H04L 1/1854 |
| 2020/0351856 A1* | 11/2020 | Yeo | | H04L 1/1861 |
| 2020/0374861 A1* | 11/2020 | Shilov | | H04W 4/46 |
| 2020/0396701 A1* | 12/2020 | Yi | | H04W 72/569 |
| 2020/0403737 A1* | 12/2020 | Yeo | | H04W 52/367 |
| 2021/0007081 A1* | 1/2021 | Shin | | H04L 1/1887 |
| 2021/0007096 A1* | 1/2021 | Huang | | H04L 5/0055 |
| 2021/0051525 A1* | 2/2021 | Cao | | H04W 76/14 |
| 2021/0058899 A1* | 2/2021 | Lee | | H04W 52/146 |
| 2021/0105789 A1* | 4/2021 | Freda | | H04W 4/40 |
| 2021/0136699 A1* | 5/2021 | Scholand | | H04W 4/40 |
| 2021/0160728 A1* | 5/2021 | Jung | | H04L 5/0064 |
| 2021/0266846 A1* | 8/2021 | Do | | H04L 5/001 |
| 2021/0314796 A1* | 10/2021 | Hoang | | H04W 24/08 |
| 2021/0400636 A1* | 12/2021 | Seo | | H04L 5/0055 |
| 2022/0180748 A1* | 6/2022 | Kwak | | G08G 1/16 |
| 2022/0330261 A1* | 10/2022 | Yeo | | H04L 5/0053 |
| 2022/0346118 A1* | 10/2022 | Wu | | H04L 1/1825 |
| 2022/0386092 A1* | 12/2022 | Hwang | | H04W 4/02 |
| 2023/0007629 A1* | 1/2023 | Min | | H04W 4/40 |

FOREIGN PATENT DOCUMENTS

| | | |
|---|---|---|
| WO | 2020/033088 A1 | 2/2020 |
| WO | 2020/033422 A1 | 2/2020 |

OTHER PUBLICATIONS

3GPP, "3rd Generation Partnership Project; Technical Specification Group Radio Access Network; NR; Physical channels and modulation (Release 15)," 3GPP TS 38.211 V15.6.0, Jun. 2019 (97 pages).

3GPP, "3rd Generation Partnership Project; Technical Specification Group Radio Access Network; NR; NR and NG-RAN Overall Description; Stage 2 (Release 15)," 3GPP TS 38.300 V15.7.0, Sep. 2019 (99 pages).

3GPP, "3rd Generation Partnership Project; Technical Specification Group Services and System Aspects; Procedures for the 5G System (5GS); Stage 2 (Release 16)," 3GPP TS 23.502 V16.4.0 (582 pages).

3GPP, "3rd Generation Partnership Project; Technical Specification Group Radio Access Network; Study on Scenarios and Requirements for Next Generation Access Technologies; (Release 15)," 3GPP TR 38.913 V15.0.0, Jun. 2018 (39 pages).

3GPP, "3rd Generation Partnership Project; Technical Specification Group Services and System Aspects; Architecture enhancements for 5G System (5GS) to support Vehicle-to-Everything (V2X) services (Release 16)," 3GPP TS 23.287 V16.0.0, Sep. 2019 (49 pages).

3GPP, "3rd Generation Partnership Project; Technical Specification Group Radio Access Network; Evolved Universal Terrestrial Radio Access (E-UTRA); Physical layer procedures (Release 16)," 3GPP TS 36.213 V16.1.0, Mar. 2020 (570 pages).

Fraunhofer HHI, Fraunhofer IIS, "Resource Allocation for Mode 2 NR V2X," R1-1908679, Agenda item: 7.2.4.2.2, 3GPP TSG RAN WG1 #98, Prague, CZ, Aug. 26-30, 2019 (7 pages).

International Search Report, mailed Sep. 9, 2020, for International Application No. PCT/SG2020/050394 (4 pages).

3GPP, "3rd Generation Partnership Project; Technical Specification Group Radio Access Network; Evolved Universal Terrestrial Radio Access (E-UTRA); Physical layer procedures (Release 15)," 3GPP TS 36.213 V15.0.0, Dec. 2017, pp. 433-435.

Lenovo, Motorola Mobility, "Discussion on resource allocation for NR sidelink Mode 2," R1-1908732, Agenda Item: 7.2.4.2.2, 3GPP TSG RAN WG1 #98, Prague, CZ, Aug. 26-30, 2019. (4 pages).

* cited by examiner

COMMUNICATION APPARATUSES AND COMMUNICATION METHODS FOR UTILIZATION OF SL-RSRP IN V2X RESOURCE SENSING AND SELECTION

TECHNICAL FIELD

The following disclosure relates to communication apparatuses and communication methods for New Radio (NR) communications, and more particularly to communication apparatuses and communication methods for utilisation of SL-RSRP in V2X resource sensing & selection.

BACKGROUND

V2X communication allows vehicles to interact with public roads and other road users, and is thus considered a critical factor in making autonomous vehicles a reality.

To accelerate this process, 5G NR based V2X communications (interchangeably referred to as NR V2X communications) is being discussed by the 3rd Generation Partnership Project (3GPP) to identify technical solutions for advanced V2X services, through which vehicles (i.e. interchangeably referred to as communication apparatuses or user equipments (UEs) that support V2X applications) can exchange their own status information through sidelink (SL) with other nearby vehicles, infrastructure nodes and/or pedestrians. The status information includes information on position, speed, heading, etc.

In such V2X communications, there are at least two SL resource allocation modes being discussed by the 3GPP. In resource allocation Mode 1, SL resource(s) to be used by a UE for SL transmissions are scheduled by a base station (BS). In resource allocation Mode 2, the UE determines, i.e. the BS does not schedule, SL transmission resources within the SL resources configured by the BS/network or pre-configured SL resources. The 3GPP study on resource allocation also considers sensing and resource selection procedures for a Mode 2(a), in the context of a semi-persistent scheme where resource(s) are selected for multiple transmissions of different transmission blocks (TBs) and a dynamic scheme where resource(s) are selected for each TB transmission.

In the 3GPP RAN WG1 #98 meeting in Prague, the following items were considered:
The resource (re-)selection procedure includes the following steps:
Step 1: Identification of candidate resources within the resource selection window (FFS details).
Step 2: Resource selection for (re-)transmission(s) from the identified candidate resources (FFS details).
In Step 1 of the resource (re-)selection procedure, a resource is not considered as a candidate resource if:
The resource is indicated in a received SCI and the associated L1 Sidelink Reference Signal Received Power (SL-RSRP) measurement is above an SL-RSRP threshold.
The SL-RSRP threshold is at least a function of the priority of the SL transmission indicated in the received SCI and the priority of the transmission for which resources are being selected by the UE.
FFS details.

However, there has been no discussion on communication apparatuses and methods for utilization of SL-RSRP in V2X resource sensing & selection.

There is thus a need for communication apparatuses and methods that provide feasible technical solutions for utilization of SL-RSRP in V2X resource sensing & selection. Furthermore, other desirable features and characteristics will become apparent from the subsequent detailed description and the appended claims, taken in conjunction with the accompanying drawings and this background of the disclosure.

SUMMARY

Non-limiting and exemplary embodiment facilitates providing communication apparatuses and methods for utilisation of SL-RSRP in V2X resource sensing & selection.

According to a first embodiment of the present disclosure, there is provided a communication apparatus comprising: circuitry which, in operation, adjusts a parameter based on at least one of a plurality of priority levels, and determines a plurality of resource candidates based on the adjusted parameter; and a transmitter which, in operation, transmits a transmission block (TB) using a resource selected from the plurality of resource candidates.

According to a second embodiment of the present disclosure, there is provided a communication method comprising: adjusting a parameter based on at least one of a plurality of priority levels; determining a plurality of resource candidates based on the adjusted parameter; and transmitting a transmission block (TB) using a resource selected from the plurality of resource candidates.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

Embodiments of the disclosure will be better understood and readily apparent to one of ordinary skilled in the art from the following written description, by way of example only, and in conjunction with the drawings, in which.

Figure 1:
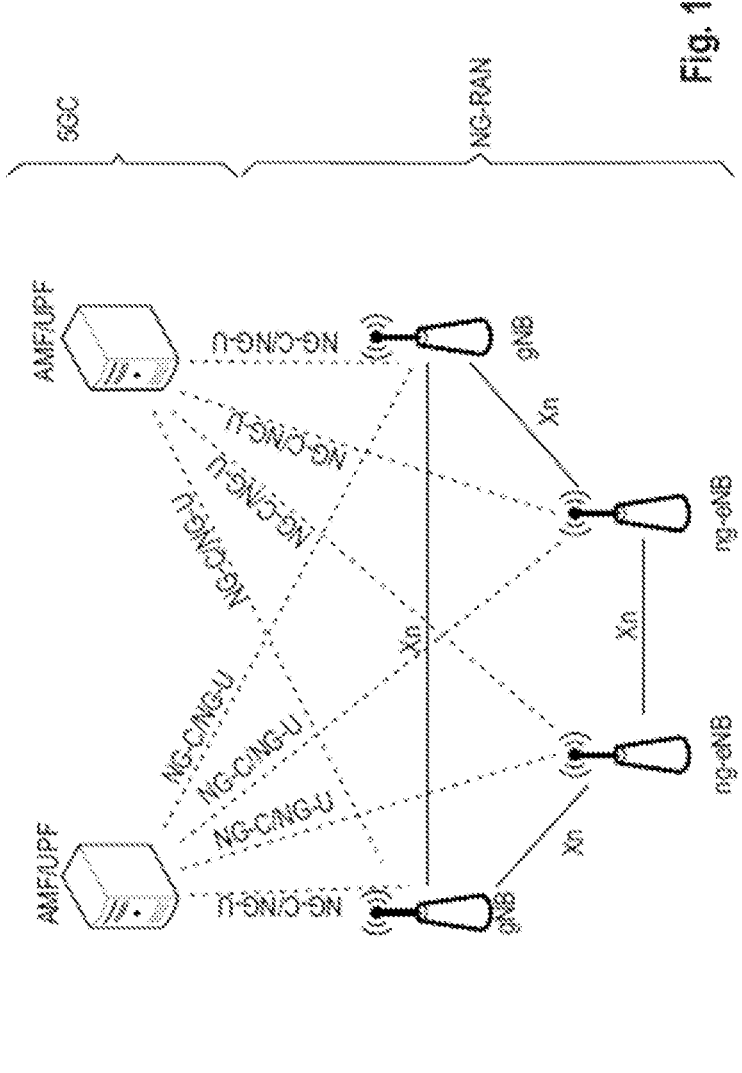
FIG. 1 shows an exemplary 3GPP NR-RAN architecture.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help to improve understanding of the present embodiments.

DETAILED DESCRIPTION

Some embodiments of the present disclosure will be described, by way of example only, with reference to the drawings. Like reference numerals and characters in the drawings refer to like elements or equivalents.

3GPP has been working at the next release for the $5^{th}$ generation cellular technology, simply called 5G, including the development of a new radio access technology (NR) operating in frequencies ranging up to 100 GHz. The first version of the 5G standard was completed at the end of 2017, which allows proceeding to 5G NR standard-compliant trials and commercial deployments of smartphones.

Among other things, the overall system architecture assumes an NG-RAN (Next Generation—Radio Access Network) that comprises gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g. a particular core entity performing the AMF) by means of the NG-C interface and to the UPF (User Plane Function) (e.g. a particular core entity performing the UPF) by means of the NG-U interface. The NG-RAN architecture is illustrated in FIG. 1 (see e.g. 3GPP TS 38.300 v15.6.0, section 4).

The user plane protocol stack for NR (see e.g. 3GPP TS 38.300, section 4.4.1) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS) sublayer (SDAP, Service Data Adaptation Protocol) is introduced above PDCP (see e.g. sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the PDCP, RLC and MAC sublayers are listed respectively in sections 6.4, 6.3, and 6.2 of TS 38.300. The functions of the RRC layer are listed in sub-clause 7 of TS 38.300.

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. It also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. For instance, the physical channels are PRACH (Physical Random Access Channel), PUSCH (Physical Uplink Shared Channel) and PUCCH (Physical Uplink Control Channel) for uplink and PDSCH (Physical Downlink Shared Channel), PDCCH (Physical Downlink Control Channel) and PBCH (Physical Broadcast Channel) for downlink.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability (1-$10^{-5}$ within 1 ms). Finally, mMTC may preferably require high connection density (1,000,000 devices/$km^2$ in an urban environment), large coverage in harsh environments, and extremely long-life battery for low cost devices (15 years).

Therefore, the OFDM numerology (e.g. subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration $T_u$ and the subcarrier spacing $\Delta f$ are directly related through the formula $\Delta f=1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v15.6.0).

Figure 2:
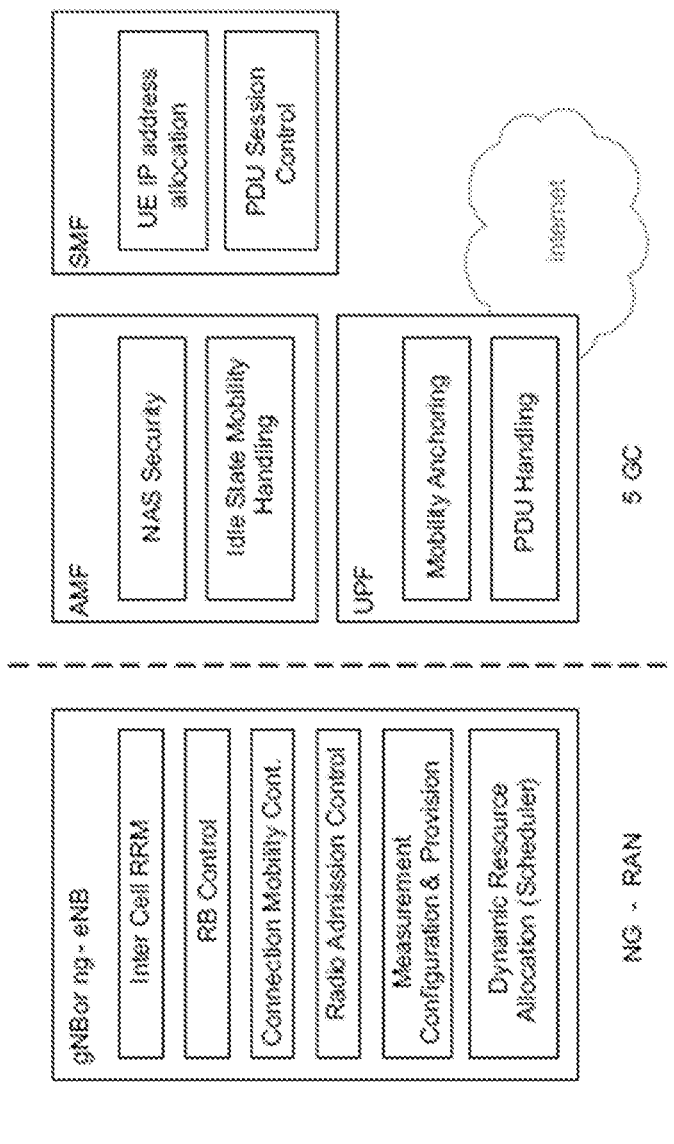
FIG. 2 depicts a schematic drawing which shows functional split between NG-RAN and 5GC.

FIG. 2 illustrates functional split between NG-RAN and 5GC. NG-RAN logical node is a gNB or ng-eNB. The 5GC has logical nodes AMF, UPF and SMF.

In particular, the gNB and ng-eNB host the following main functions:

- Functions for Radio Resource Management such as Radio Bearer Control, Radio Admission Control, Connection Mobility Control, Dynamic allocation of resources to UEs in both uplink and downlink (scheduling);
- IP header compression, encryption and integrity protection of data;
- Selection of an AMF at UE attachment when no routing to an AMF can be determined from the information provided by the UE;
- Routing of User Plane data towards UPF(s);
- Routing of Control Plane information towards AMF;
- Connection setup and release;
- Scheduling and transmission of paging messages;
- Scheduling and transmission of system broadcast information (originated from the AMF or OAM);
- Measurement and measurement reporting configuration for mobility and scheduling;
- Transport level packet marking in the uplink;
- Session Management;
- Support of Network Slicing;
- QoS Flow management and mapping to data radio bearers;
- Support of UEs in RRC INACTIVE state;
- Distribution function for NAS messages;
- Radio access network sharing;
- Dual Connectivity;
- Tight interworking between NR and E-UTRA.

The Access and Mobility Management Function (AMF) hosts the following main functions:

- Non-Access Stratum, NAS, signaling termination;
- NAS signaling security;
- Access Stratum, AS, Security control;
- Inter Core Network, CN, node signaling for mobility between 3GPP access networks;
- Idle mode UE Reachability (including control and execution of paging retransmission);
- Registration Area management;
- Support of intra-system and inter-system mobility;
- Access Authentication;
- Access Authorization including check of roaming rights;
- Mobility management control (subscription and policies);
- Support of Network Slicing;
- Session Management Function, SMF, selection.

Furthermore, the User Plane Function, UPF, hosts the following main functions:

- Anchor point for Intra-/Inter-RAT mobility (when applicable);
- External PDU session point of interconnect to Data Network;
- Packet routing & forwarding;
- Packet inspection and User plane part of Policy rule enforcement;
- Traffic usage reporting;
- Uplink classifier to support routing traffic flows to a data network;
- Branching point to support multi-homed PDU session;
- QoS handling for user plane, e.g. packet filtering, gating, UL/DL rate enforcement;
- Uplink Traffic verification (SDF to QoS flow mapping);
- Downlink packet buffering and downlink data notification triggering.

Finally, the Session Management function, SMF, hosts the following main functions:

- Session Management;
- UE IP address allocation and management;
- Selection and control of UP function;
- Configures traffic steering at User Plane Function, UPF, to route traffic to proper destination;
- Control part of policy enforcement and QoS;
- Downlink Data Notification.

Figure 3:
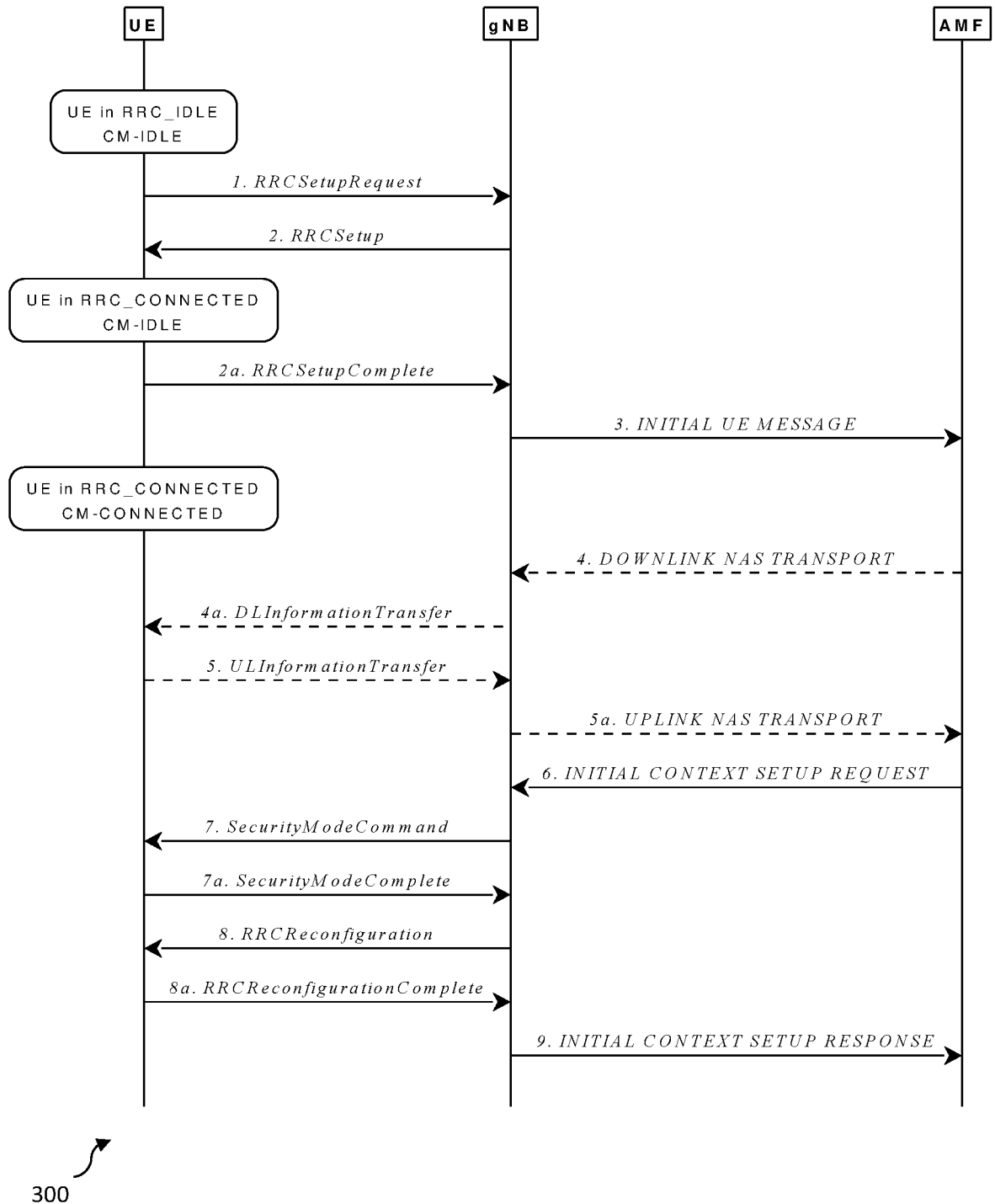
FIG. 3 depicts a sequence diagram for RRC connection setup/reconfiguration procedures.

FIG. 3 illustrates some interactions between a UE, gNB, and AMF (an 5GC entity) in the context of a transition of the UE from RRC_IDLE to RRC_CONNECTED for the NAS part (see TS 38.300 v15.7.0). The transition steps are as follows:

1. The UE requests to setup a new connection from RRC_IDLE.
2/2a. The gNB completes the RRC setup procedure.
NOTE: The scenario where the gNB rejects the request is described below.
3. The first NAS message from the UE, piggybacked in RRCSetupComplete, is sent to AMF.
4/4a/5/5a. Additional NAS messages may be exchanged between UE and AMF, see TS 23.502 [22].
6. The AMF prepares the UE context data (including PDU session context, the Security Key, UE Radio Capability and UE Security Capabilities, etc.) and sends it to the gNB.
7/7a. The gNB activates the AS security with the UE.
8/8a. The gNB performs the reconfiguration to setup SRB2 and DRBs.
9. The gNB informs the AMF that the setup procedure is completed.

RRC is a higher layer signaling (protocol) used for UE and gNB configuration. In particular, this transition involves that the AMF prepares the UE context data (including e.g. PDU session context, the Security Key, UE Radio Capability and UE Security Capabilities, etc.) and sends it to the gNB with the INITIAL CONTEXT SETUP REQUEST. Then, the gNB activates the AS security with the UE, which is performed by the gNB transmitting to the UE a SecurityModeCommand message and by the UE responding to the gNB with the SecurityModeComplete message. Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signaling-only connection, the steps relating to the RRCReconfiguration are skipped since SRB2 and DRBs are not setup. Finally, the gNB informs the AMF that the setup procedure is completed with the INITIAL CONTEXT SETUP RESPONSE.

Figure 4:
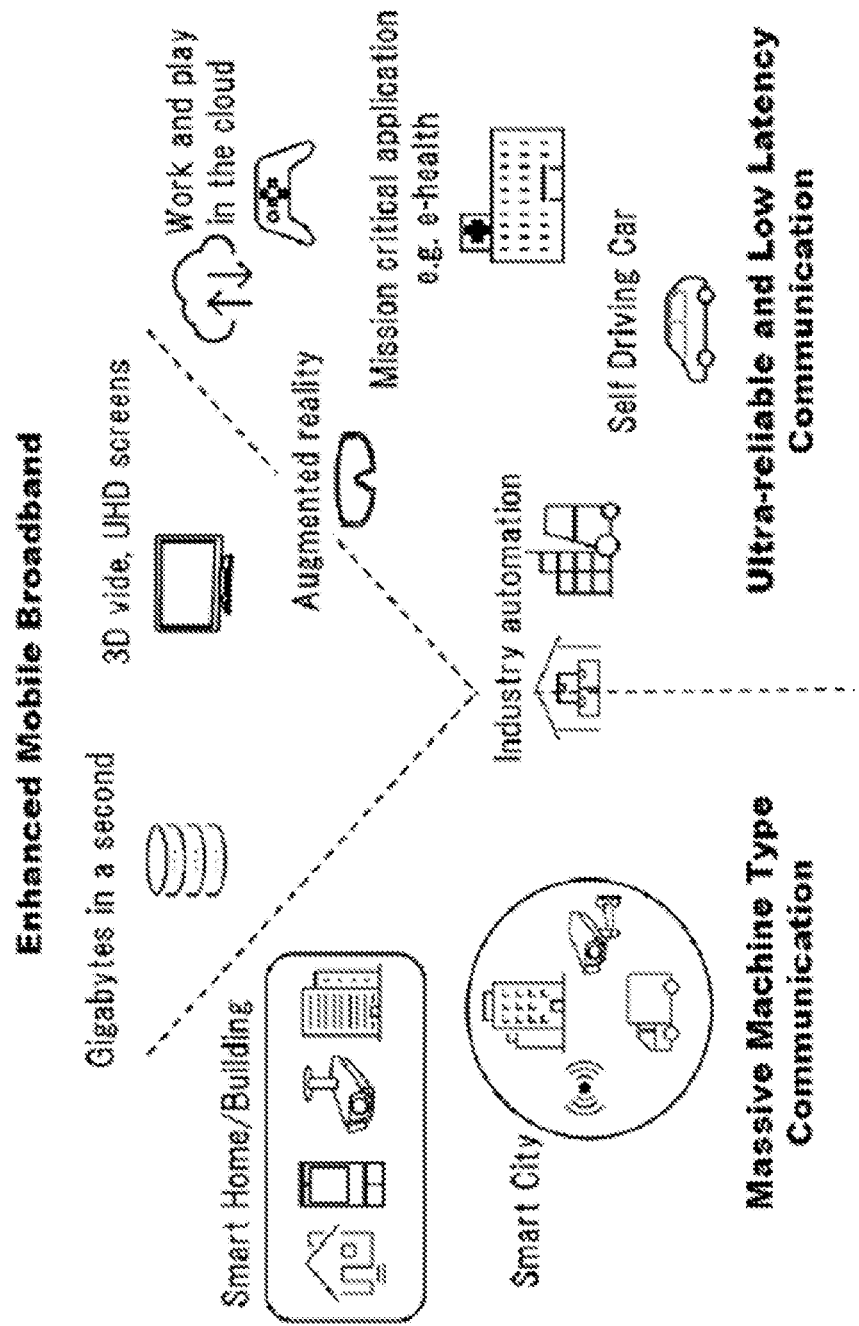
FIG. 4 depicts a schematic drawing showing usage scenarios of Enhanced mobile broadband (eMBB), Massive Machine Type Communications (mMTC) and Ultra Reliable and Low Latency Communications (URLLC).

FIG. 4 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications. FIG. 4 illustrates some examples of envisioned usage scenarios for IMT for 2020 and beyond (see e.g. ITU-R M.2083 FIG. 2).

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, etc. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, and especially necessary for URLLC and mMTC, is high reliability or ultra-reliability. Several mechanisms can be considered to improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC, further use cases with tighter requirements have been identified such as factory automation, transport industry and electrical power distribution, including factory automation, transport industry, and electrical power distribution. The tighter requirements are higher reliability (up to $10^{-6}$ level), higher availability, packet sizes of up to 256 bytes, time synchronization down to the order of a few μs where the value can be one or a few μs depending on frequency range and short latency in the order of 0.5 to 1 ms in particular a target user plane latency of 0.5 ms, depending on the use cases.

Moreover, for NR URLLC, several technology enhancements from the physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements have been identified. The term "mini-slot" refers to a Transmission Time Interval (TTI) including a smaller number of symbols than a slot (a slot comprising fourteen symbols).

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearers (DRB) together with the PDU Session, and additional DRB(s) for QoS flow(s) of that PDU session can be subsequently configured (it is up to NG-RAN when to do so), e.g. as shown above with reference to FIG. 3. The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 5:
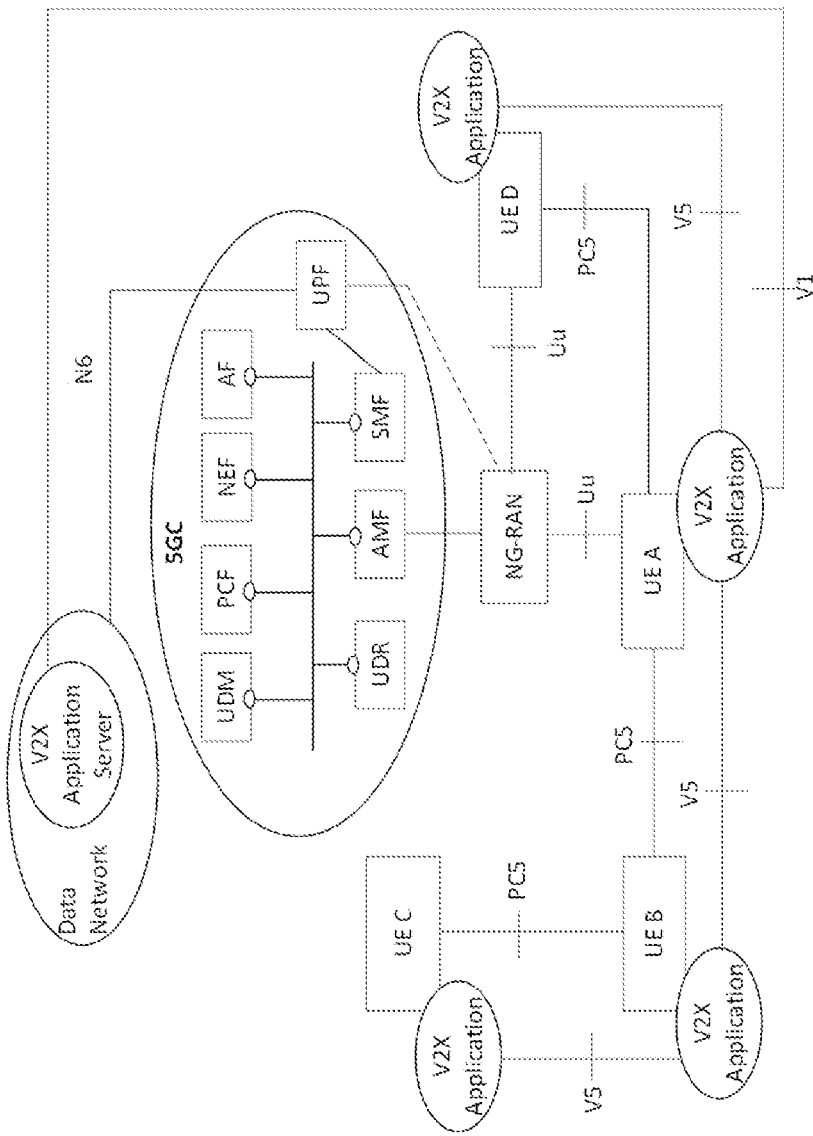
FIG. 5 shows a block diagram showing an exemplary 5G system architecture for V2X communication in a non-roaming scenario.

FIG. 5 illustrates a 5G NR non-roaming reference architecture (see TS 23.287 v16.0.0, section 4.2.1.1). An Application Function (AF), e.g. an external application server hosting 5G services, exemplarily described in FIG. 4, interacts with the 3GPP Core Network in order to provide services, for example to support application influence on traffic routing, accessing Network Exposure Function (NEF) or interacting with the Policy framework for policy control (see Policy Control Function, PCF), e.g. QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 5 shows further functional units of the 5G architecture for V2X communication, namely, Unified Data Management (UDM), Policy Control Function (PCF), Network Exposure Function (NEF), Application Function (AF), Unified Data Repository (UDR), Access and Mobility Management Function (AMF), Session Management Function (SMF), and User Plane Function (UPF) in the 5GC, as well as with V2X Application Server (V2AS) and Data Network (DN), e.g. operator services, Internet access or 3rd party services. All of or a part of the core network functions and the application services may be deployed and running on cloud computing environments.

In the present disclosure, thus, an application server (for example, AF of the 5G architecture), is provided that comprises a transmitter, which, in operation, transmits a request containing a QoS requirement for at least one of URLLC, eMMB and mMTC services to at least one of functions (for example NEF, AMF, SMF, PCF,UPF, etc) of the 5GC to establish a PDU session including a radio bearer between a gNodeB and a UE in accordance with the QoS requirement and control circuitry, which, in operation, performs the services using the established PDU session.

In the present disclosure, an application server (for example, V2X Application Server in FIG. 5) may be provided to handle QoS requirements for V2X communications as per defined in Section 5.4 of TS23.287.

PHY layer sensing and reporting of resources in LTE V2X are defined in the TS36.213 section 14.1.1.6 as per the following steps:

1) A candidate single-subframe resource for PSSCH transmission $R_{x,y}$ is defined as a set of $L_{subCH}$ contiguous sub-channels with sub-channel x+j in subframe $t_y^{SL}$ where j=0, . . . , $L_{subCH}$−1. The UE shall assume that any set of $L_{subCH}$ contiguous sub-channels included in the corresponding PSSCH resource pool (described in 14.1.5) within the time interval [n+$T_1$, n+$T_2$] corresponds to one candidate single-subframe resource, where selections of $T_1$ and $T_2$ are up to UE implementations under $T_1 \leq 4$ and $T_{2min}(prio_{TX}) \leq T_2 \leq 100$ if $T_{2min}(prio_{TX})$ is provided by higher layers for $prio_{TX}$, otherwise $20 \leq T_2 \leq 100$. UE selection of $T_2$ shall fulfil the latency requirement. The total number of the candidate single-subframe resources is denoted by $M_{total}$.

2) The UE shall monitor subframes $t_{n'-10\times P_{step}}^{SL}$, $t_{n'-10\times P_{step}+1}^{SL}$, . . . , $t_{n'-1}^{SL}$ except for those in which its transmissions occur, where $t_{n'}^{SL}$=n if subframe n belongs to the set ($t_0^{SL}$, $t_1^{SL}$, . . . , $t_{T_{max}}^{SL}$), otherwise subframe $T_{n'}^{SL}$ is the first subframe after subframe n belonging to the set ($t_0^{SL}$, $t_1^{SL}$, . . . , $t_{T_{max}}^{SL}$). The UE shall perform the behaviour in the following steps based on PSCCH decoded and S-RSSI measured in these subframes.

3) The parameter $Th_{a,b}$ is set to the value indicated by the i-th SL-ThresPSSCH-RSRP field in SL-ThresPSSCH-RSRP-List where i=a*8+b+1.

4) The set $S_A$ is initialized to the union of all the candidate single-subframe resources. The set $S_B$ is initialized to an empty set.

5) The UE shall exclude any candidate single-subframe resource $R_{x,y}$ from the set $S_A$ if it meets all the following conditions:
   the UE has not monitored subframe $t_z^{SL}$ in Step 2.
   there is an integer j which meets $y+j\times P_{rsvp\_TX}'=z+P_{step}\times k\times q$ where j=0, 1, . . . , $C_{reset}$−1, $P_{rsvp\_TX}'=P_{step}\times P_{rsvp\_TX}/100$, k is any value allowed by the higher layer parameter restrictResourceReservationPeriod and q=1, 2, . . . , Q. Here, $$Q = \frac{1}{k}$$

if k<1 and $n'-z \leq P_{step}\times k$, where $t_{n'}^{SL}$=n if subframe n belongs to the set $t_0^{SL}$, $t_1^{SL}$, . . . , $t_{T_{max}}^{SL}$, otherwise subframe $t_{n'}^{SL}$ is the first subframe belonging to the set $t_0^{SL}$, $t_1^{SL}$, . . . , $t_{T_{max}}^{SL}$ after subframe n; and Q=1 otherwise.

6) The UE shall exclude any candidate single-subframe resource $R_{x,y}$ from the set $S_A$ if it meets all the following conditions:
   the UE receives an SCI format 1 in subframe $t_m^{SL}$, and "Resource reservation" field and "Priority" field in the received SCI format 1 indicate the values $P_{rsvp\_RX}$ and $prio_{RX}$, respectively according to Sub-clause 14.2.1.
   PSSCH-RSRP measurement according to the received SCI format 1 is higher than $Th_{prio_{TX},prio_{RX}}$.
   the SCI format received in subframe $t_m^{SL}$ or the same SCI format 1 which is assumed to be received in subframe(s) $t_{m+q\times P_{step}\times P_{rsvp\_RX}}^{SL}$ determines according to 14.1.1.4C the set of resource blocks and subframes which overlaps with $R_{x,y+j\times P_{rsvp\_TX}'}$ for q=1, 2, . . . , Q and j=0, 1, . . . , $C_{reset}$−1. Here, $$Q = \frac{1}{P_{rsvp\_RX}}$$

if $P_{rsvp\_RX}<1$ and $n'-m \leq P_{step}\times P_{rsvp\_RX}$, where $t_n^{SL}$=n if subframe n belongs to the set ($t_0^{SL}$, $t_1^{SL}$, . . . , $t_{T_{max}}^{SL}$), otherwise subframe $t_{n'}^{SL}$ is the first subframe after subframe n belonging to the set ($t_0^{SL}$, $t_1^{SL}$, . . . , $t_{T_{max}}^{SL}$); otherwise Q=1.

7) If the number of candidate single-subframe resources remaining in the set $S_A$ is smaller than $0.2 \cdot M_{total}$, then Step 4 is repeated with $Th_{a,b}$ increased by 3 dB.

8) For a candidate single-subframe resource $R_{x,y}$ remaining in the set $S_A$, the metric $E_{x,y}$ is defined as the linear average of S-RSSI measured in sub-channels x+k for k=0, . . . , $L_{subCH}$−1 in the monitored subframes in Step 2 that can be expressed by $t_{y-P_{rsvp}'*j}^{SL}$ for a non-negative integer j if $P_{rsvp\_TX} \geq 100$, and $$t_{y-P_{rsvp\_TX}'*j}^{SL}$$

for a non-negative integer j otherwise.

9) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to $0.2 \cdot M_{total}$.

10) When the UE is configured by upper layers to transmit using resource pools on multiple carriers, it shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time [10].

The UE shall then report set $S_B$ to higher layers.

Figure 6:
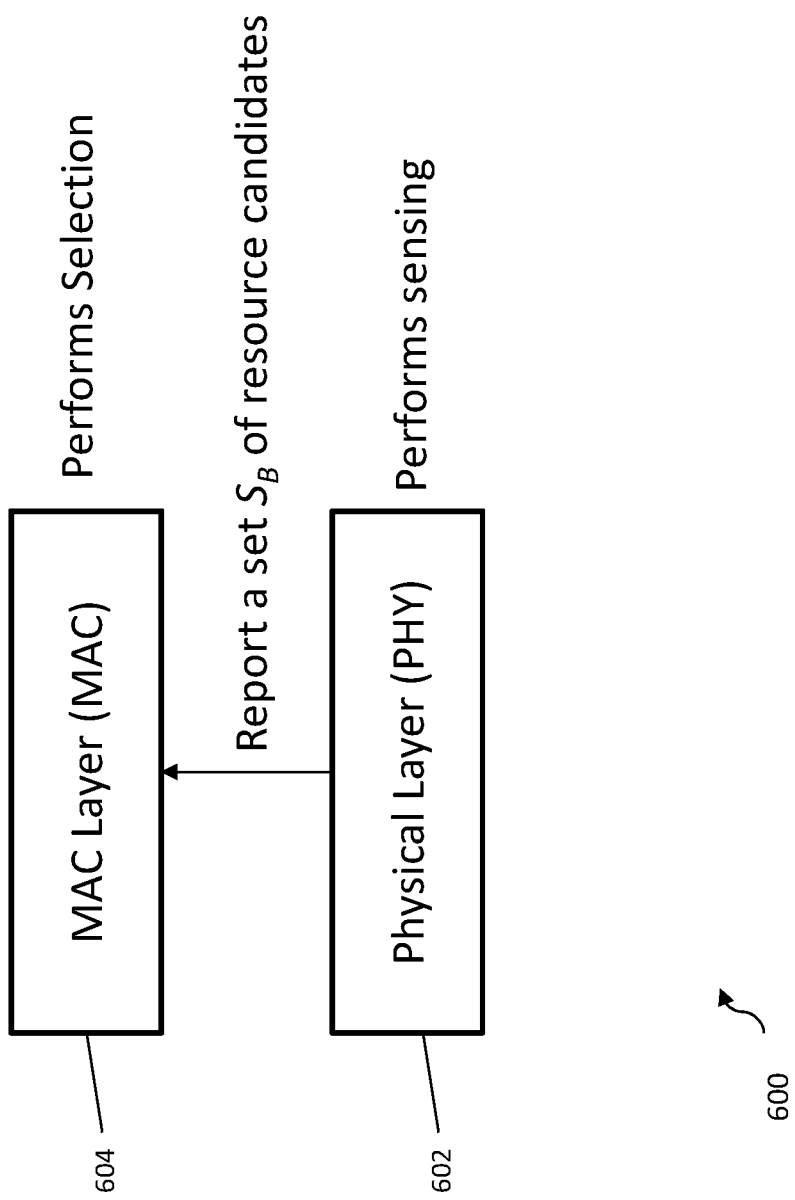
FIG. 6 depicts a schematic diagram 600 illustrating a V2X resource sensing & selection process according to various embodiments.

FIG. 6 depicts a schematic diagram 600 illustrating a V2X resource sensing & selection process according to various embodiments. For example, the PHY layer 602 of a UE performs sensing procedures for resource candidates from an initial set $S_A$ and then reports a set of resource candidates $S_B$ to the MAC layer 604 of the UE or the base station. The initial set of $S_A$ contains all $M_{total}$ candidate resources for a transmission of a TB. The PHY layer 602 may perform, during the sensing procedures, a step of resource exclusion such that the resource candidates are excluded from the initial set $S_A$ until the number of resource candidates in set $S_A$ is smaller than $0.2 \cdot M_{total}$. The set $S_B$ that is reported to the MAC layer 604 contains $\geq 20\% * M_{total}$ resource candidates with the lowest RSRP from the remaining set $S_A$ after the resource exclusion step.

The UE(s) may include, for example, communication modules integrated or installed in vehicles subscribed to communication services of one or more telecommunications/Public Land Mobile Network (PLMN) operators. The UE(s) may be subscribed to a telecommunication/PLMN operator operator and communicates with a base station of the telecommunication operator. The base station may be a next generation NodeB (gNB). It can be appreciated by those skilled in the art that the base station can also be a ng-eNB, and may be connected via the NG interface to a 5G core network.

The SL transmission of the TB may be via a Physical Sidelink Shared Channel (PSSCH) and its corresponding control information SCI may be transmitted via a Physical Sidelink Control Channel (PSCCH).

Thus far, in LTE, the default formula/setting for the initial value of $Th_{a,b}$ sensing procedure is common for transmission with different priorities (for example the $prio_{TX}$). As a result, low priority transmissions can prevent high priority transmission, especially when the channel is congested.

Therefore, the present invention proposes an improved resource (re-) selection procedure for SL transmissions with different priorities to address the above-mentioned issue, whereby procedures for identification of resource candidates are distinguished for different priorities of a transmission ($prio_{TX}$) by (pre-)configuration (for example, by a pre-configuration and/or by a higher layer signaling). Restrictions are independently (pre-)configured for transmissions with high priority (or belong to a high priority group) and transmissions with low priority (or belong to a low priority group) respectively. Depending on the priority of the transmission (or the priority category of the transmission), only one set of resources ($S_B$) will be reported to the higher layer.

Advantageously, transmissions with low priority do not prevent transmissions with high priority. Less crowded candidate resources (and/or more candidate resources) could be used for the sidelink transmission, especially for transmissions with higher priorities. Furthermore, less complexity is achieved if priorities are categorized into groups hence lower power consumption.

In the following paragraphs, certain exemplifying embodiments are explained with reference to a V2X communications mechanism that advantageously utilise SL-RSRP in V2X resource sensing & selection, so that the procedures for identification of resource candidates are distinguished for different priorities of the transmission.

Figure 7:
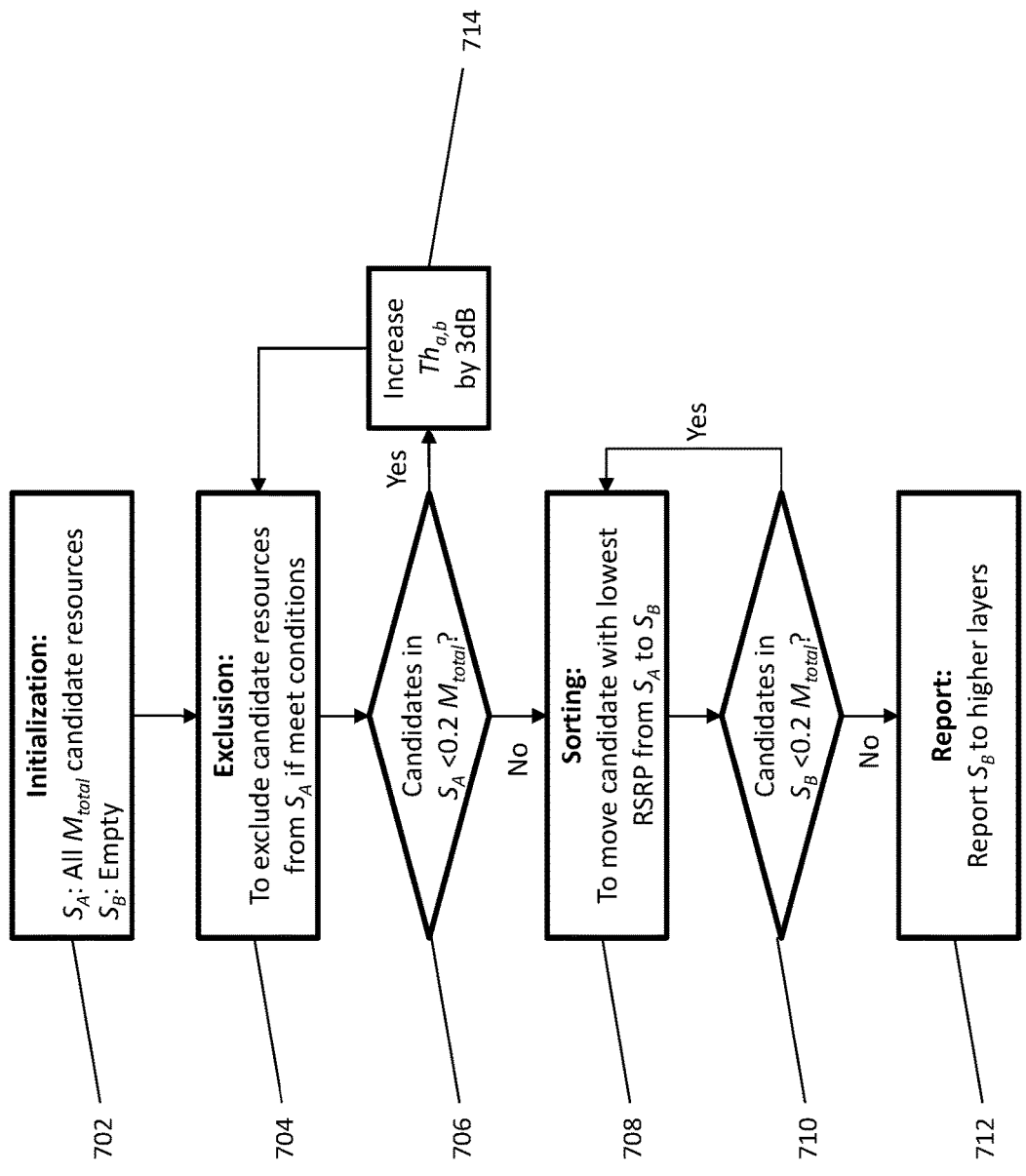
FIG. 7 shows a flow diagram 700 illustrating how a physical (PHY) layer performs sensing according to various embodiments.

FIG. 7 shows a flow diagram 700 illustrating how a PHY layer, such as the PHY layer 602, performs sensing according to various embodiments. At step 702, the PHY layer senses a set $S_A$ with all $M_{total}$ resource candidates. At step 704, the PHY layer performs an iteration of resource exclusion such that resource candidates are excluded from set $S_A$ if certain conditions are met. At step 706, it is determined whether the number of resource candidates remaining in $S_A$ after the resource exclusion step 704 is <0.2 $M_{total}$. If it is determined that the number of resource candidates remaining in $S_A$ after the resource exclusion step 704 is <0.2 $M_{total}$, the process proceeds to step 714 where the $Th_{a,b}$ is increased by 3 dB, and then proceeds back to step 704 for a repeated procedure of the resource exclusion process, until it is determined at step 706 that the set $S_A$ contains ≤20%*$M_{total}$ resource candidates.

Thereafter, the process proceeds to a sorting step 708 where candidate resources with lowest RSRP are moved from $S_A$ to $S_B$. At step 710, it is determined whether the number of resource candidates in set $S_B$<0.2 $M_{total}$. If it is determined that the number of resource candidates in set $S_B$ is <0.2 $M_{total}$, the process repeats sorting step 708 until the number of resource candidates in set $S_B$ is ≥0.2 $M_{total}$. At step 712, the set $S_B$ is reported to the higher layers, for example the MAC layer 604.

In various embodiments, certain modifications may be made to the process as shown in FIG. 6 so that the procedures for identification of resource candidates are distinguished for different priorities of the transmission. For example, a parameter in the process shown in FIG. 6 may be adjusted based on at least one of a plurality of priority levels, and a plurality of resource candidates may be determined based on the adjusted parameter. A resource may then be selected from the plurality of resource candidates for transmission of a TB.

In various embodiments, the parameter may be adjusted up to a maximum value relating to the at least one of the plurality of priority levels, wherein the maximum value may be indicated by a pre-configuration or a higher layer signaling. The parameter may also be adjusted to a first maximum value relating to a first priority level or a second maximum value relating to a second priority level, wherein the first and second maximum values may be indicated by a pre-configuration or a higher layer signaling.

In various embodiments, the parameter may be increased by a (pre-) configured value up to a maximum value of the parameter when the plurality of resource candidates meets a certain condition. The (pre-)configured value may be indicated by pre-configuration or by higher layer signaling. The pre-configured value may be different among the plurality of priority levels so that the plurality of resource candidates are distinguished among the different priority levels. However, it is possible for the pre-configured value to be the same for priority levels wherein the plurality of resource candidates need not be distinguished.

In various embodiments, the at least one of the plurality of priority levels may comprise a priority level of the TB that is to be transmitted, and may be indicated by a pre-configuration and/or a control information. The plurality of priority levels may also be categorised into one or more priority groups, wherein each of the one or more priority groups comprises one or more priority levels, such that the parameter may be adjusted up to a maximum value relating to a priority group which the at least one of the plurality of priority levels is categorised. The maximum value may be different among the priority groups so that the plurality of resource candidates are distinguished among the different priority groups. However, it is possible for the maximum value to be the same for priority groups wherein the plurality of resource candidates need not be distinguished.

The $Th_{a,b}$ may be utilised as the parameter to be adjusted. Assuming two priority levels (e.g. two $prio_{TX}$ levels) are (pre-)configured, such as HighTx (for transmissions with high priority) and LowTx (for transmissions with low priority), an operation example would be as follows:

1. A ThTimesLowResourceForLowTx may be (pre-)configured as a maximum number where $Th_{a,b}$ can be increased for the resource indicated by LowTx for the transmission of LowTx. A ThTimesHighAndLowResourceForHighTx may be (pre-)configured as a maximum number where $Th_{a,b}$ can be increased for the resource indicated by HighTx or LowTx for the transmission of HighTx.
2. In the flowchart as in FIG. 6, if the remaining resource candidates in set $S_A$ is less than the candidate resource ratio (e.g., 20% as in LTE) in the $1^{st}$ iteration of the exclusion process:
   if $prio_{TX}$ is LowTx,
   $Th_{a,b}$ of the resource indicated by LowTx is increased up to Th TimesLowResourceForLowTx until 20%*$M_{total}$ remaining resource candidates are satisfied in set $S_A$ if not, the resource is reported to the upper layer in set $S_B$ if prio$_{TX}$ is HighTx, Th$_{a,b}$ of the resource indicated by HighTx or LowTx is increased up to ThTimesHighAndLowResourceForHighTx until 20%*M$_{total}$ remaining candidate resources are satisfied in set $S_A$ if not, the resource is reported to the upper layer in set $S_B$ The rest of the operation would then be legacy as in LTE.

Figure 8:
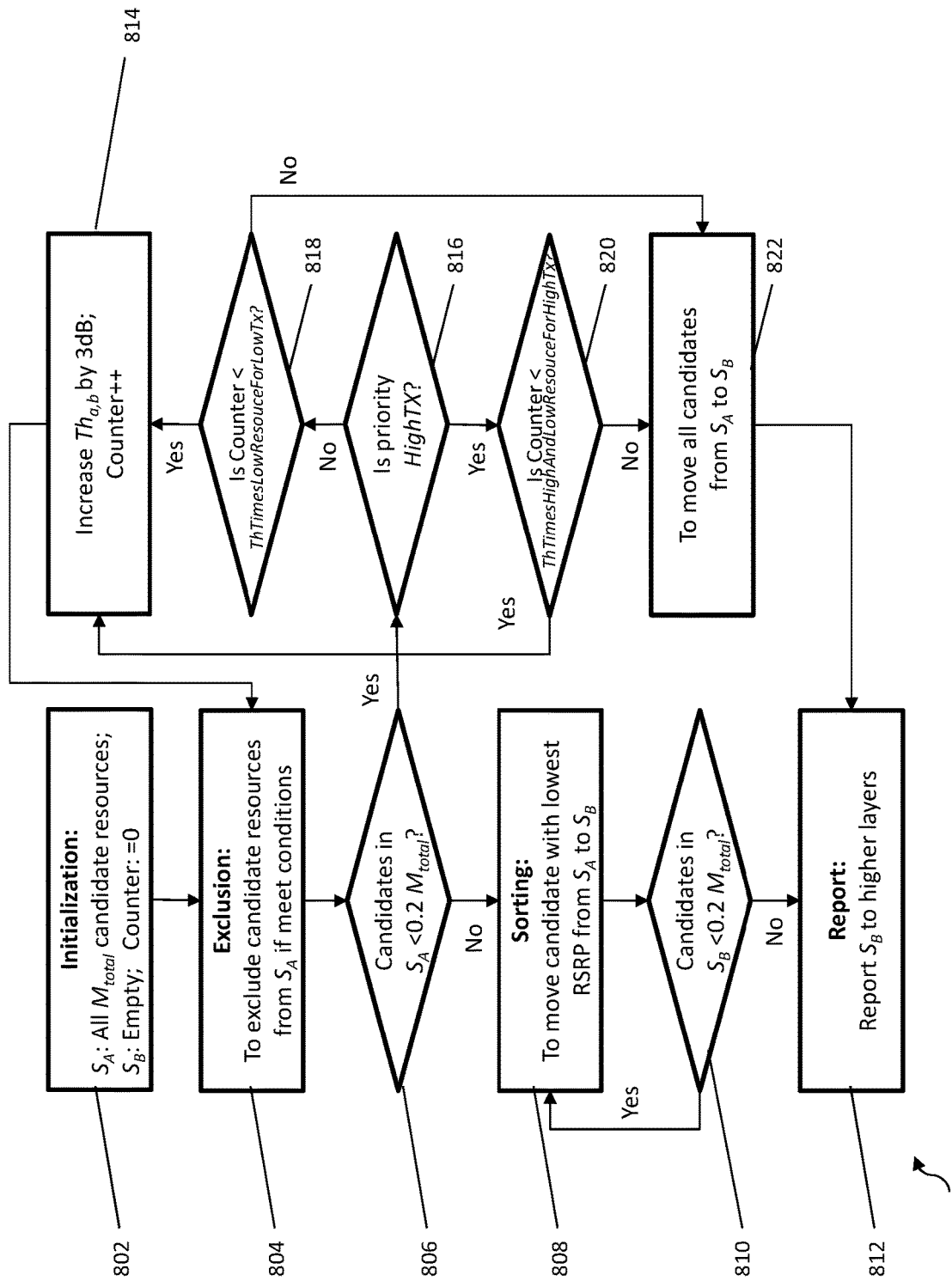
FIG. 8 shows a flow diagram 800 illustrating how SL-RSRP is utilised in V2X resource sensing & selection according to an embodiment.

The above operation example is illustrated in the flow diagram 800 in FIG. 8. At step 802, the PHY layer, for example, the PHY layer 602, senses a set $S_A$ with all M$_{total}$ resource candidates. At step 804, the PHY layer performs an iteration of resource exclusion such that resource candidates are excluded from set $S_A$ if certain conditions are met. At step 806, it is determined whether the number of resource candidates remaining in $S_A$ after the resource exclusion step 804 is <0.2 M$_{total}$. If it is determined that the number of resource candidates remaining in $S_A$ after the resource exclusion step 804 is not <0.2 M$_{total}$, the process proceeds to step 816, where it is determined whether the transmission priority is HighTx. Otherwise, the process proceeds to a sorting step 808 where candidate resources with lowest RSRP are moved from $S_A$ to $S_B$. At step 810, it is determined whether the number of resource candidates in set $S_B$<0.2 M$_{total}$. If it is determined that the number of resource candidates in set $S_B$ is <0.2 M$_{total}$, the process repeats sorting step 808 until the number of resource candidates in set $S_B$ is ≥0.2 M$_{total}$. At step 812, the set $S_B$ is reported to the higher layers, for example the MAC layer 604.

The example operation in flow diagram 800 begins at step 806 when it is determined that the number of resource candidates remaining in $S_A$ after the resource exclusion step 804 is <0.2 M$_{total}$. The process then proceeds to step 816 where it is determined whether the transmission priority is HighTx. If it is determined that the priority is HighTx (for example, the priority of the transmission prio$_{TX}$ is HighTx), the process proceeds to step 818 to check whether a counter value is less than the ThTimesLowResouceForLowTx If it is determined that the counter value is less than the ThTimesLowResouceForLowTx, the process proceeds to step 814 where the Th$_{a,b}$ is increased by 3 dB and the counter value is incremented by, for example, a value of 1. The process then proceeds back to step 804 for a repeated procedure of the resource exclusion process. If it is determined at step 818 that the counter value is not less than the ThTimesLowResouceForLowTx, the process proceeds to step 822 where all resource candidates are moved from $S_A$ to $S_B$. The process then proceeds to step 812 where the $S_B$ is reported to the higher layers.

On the other hand, if it is determined in step 816 that the priority is not HighTx, (for example, the transmission priority prio$_{TX}$ is LowTx), the process proceeds to step 820 where it is determined whether a counter value is less than ThTimesHighAndLowResouceForHighTx. If so, the process proceeds to step 814 where the Th$_{a,b}$ is increased by 3 dB and the counter value is incremented by, for example, a value of 1. The process then proceeds back to step 804 for a repeated procedure of the resource exclusion process. If it is determined in step 820 that the counter value is not less than ThTimesHighAndLowResouceForHighTx, the process then proceeds to step 822 to move all resource candidates from $S_A$ to $S_B$. The process then proceeds to step 812 where the $S_B$ is reported to the higher layers.

For the 8 priority levels (0-7, 3 bits as in LTE) of prio$_{TX}$, they can be categorized into two groups by pre-configuration or by higher level signaling, for example, HighTx (for priority 0-3) and LowTx (for priority 4-7) as mentioned above. Advantageously, less complexity is achieved if priorities are categorized into groups, hence allowing lower power consumption. It will be appreciated that the plurality of priority levels may also be categorized into a plurality of priority groups.

In various embodiments, the above flow process increases the parameter (Th$_{a,b}$ in this case) by at most a pre-configured number of iterations for the exclusion process from a set $S_A$. The pre-configured number of iterations is based on an at least one of the plurality of priority levels. The plurality of resources remaining in the set $S_A$ after the exclusion process are then moved to a set $S_B$ after the parameter is increased by the pre-configured number of iterations. The set $S_B$ is then reported to the higher layer.

Figure 9:
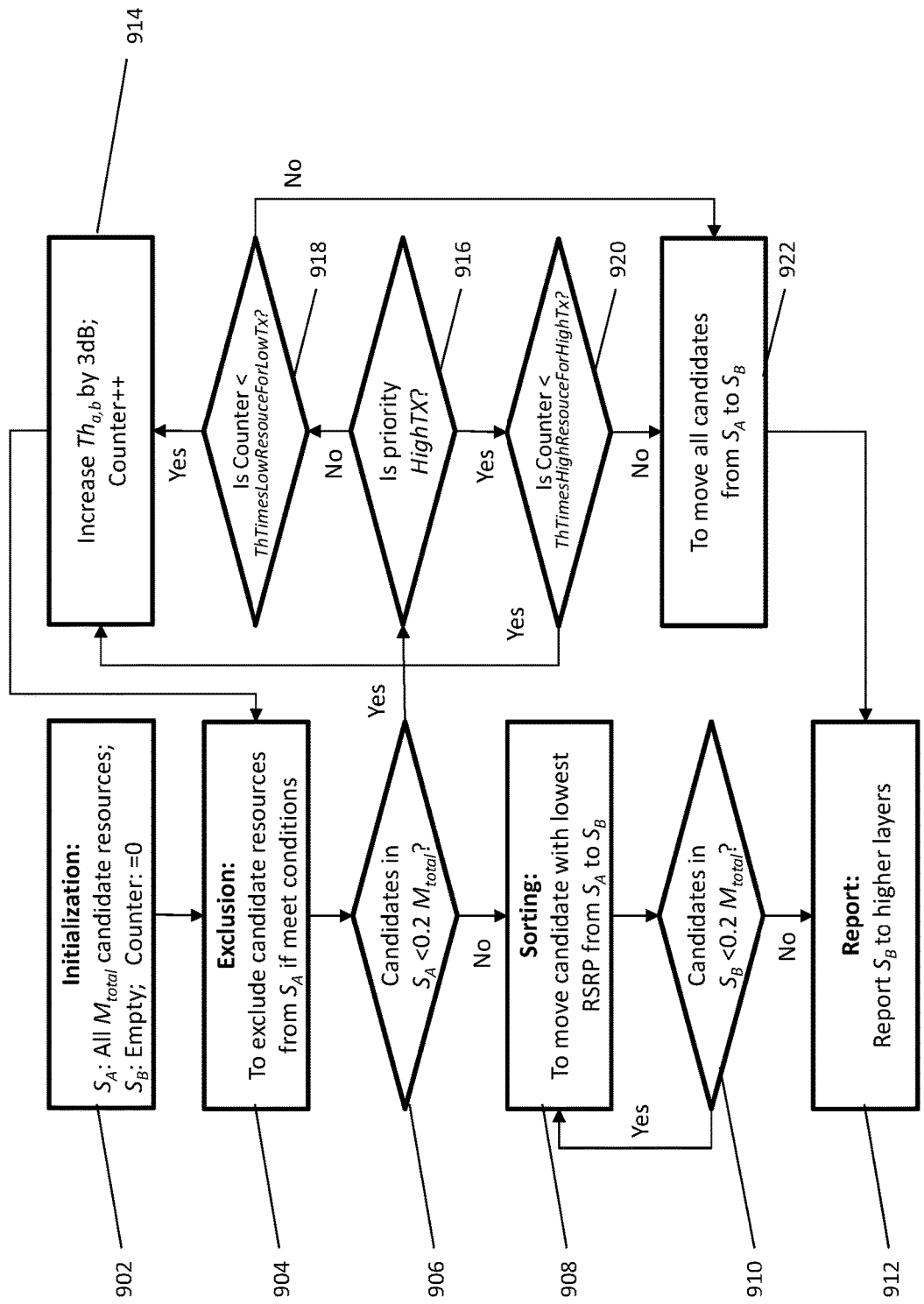
FIG. 9 shows a flow diagram 900 illustrating how SL-RSRP is utilised in V2X resource sensing & selection according to another embodiment.
Figure 10:
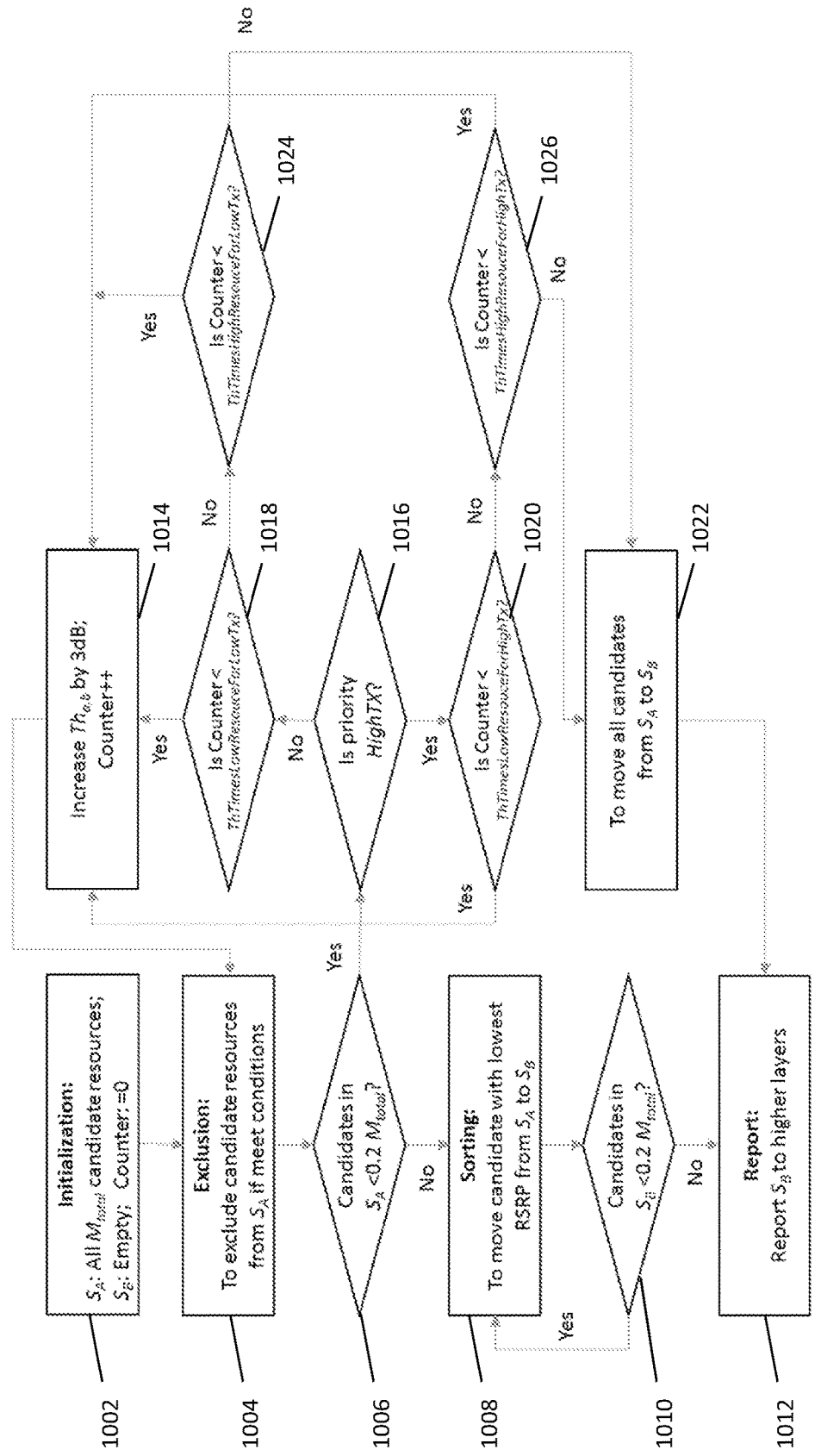
FIG. 10 shows a flow diagram 1000 illustrating how SL-RSRP is utilised in V2X resource sensing & selection according to yet another embodiment.

In various embodiments, a ThTimesHighResourceForHighTx (instead of ThTimesHighAndLowResouceForHighTx as shown in step 820 in the flow diagram 800 of FIG. 8) may be (pre-)configured as a maximum number where Th$_{a,b}$ can be increased for the resource indicated by HighTx for the transmission with a priority level of HighTx. FIG. 9 shows a flow diagram 900 that illustrates the same process as that of flow diagram 800, except that in step 906 (corresponding to step 806 of flow diagram 800), the ThTimesHighResourceForHighTx instead of ThTimesHighAndLowResouceForHighTx is used. For example, In the flow diagram 900 as in FIG. 9, if remaining candidate resources in set $S_A$ is less than the candidate resource ratio (e.g., 20% as in LTE) in the 1$^{st}$ iteration at step 906:

if prio$_{TX}$ is LowTx,

Th$_{a,b}$ of the resource indicated by LowTx is increased up to ThTimesLowResourceForLowTx until 20%*M$_{total}$ remaining resource candidates are satisfied in set $S_A$ if not, the resource is reported to the upper layer in set $S_B$ if prio$_{TX}$ is HighTx, Th$_{a,b}$ of the resource indicated by HighTx is increased up to ThTimesHighResourceForHighTx until 20% M$_{total}$ remaining candidate resources are satisfied in set $S_A$ if not, the resource is reported to the upper layer in set $S_B$ In various embodiments, the process as shown in flow diagram 800 may be further expanded to include additional iterations from step 818 and/or step 820 of flow diagram 800. Flow diagram 1000 of FIG. 10 illustrates the same process as shown in flow diagram 800 with the inclusion of such additional processes at step 1018 (corresponding to step 818 of flow diagram 800) and step 1020 (corresponding to step 820 of flow diagram 800). For example, a ThTimesHighResourceForLowTx may be (pre-)configured as a maximum number (can be a value of zero) where Th$_{a,b}$ can be increased for resource(s) indicated by HighTx for a transmission with a priority level of LowTx, and a ThTimesLowResourceForHighTx may be (pre-)configured as a maximum number where Th$_{a,b}$ can be increased for resource(s) indicated by LowTx for a transmission with a priority level of HighTx. The ThTimesHighResourceForLowTx and ThTimesLowResourceForHighTx are utilised in steps 1024 and 1026 of flow diagram 1000 respectively. In various embodiments, the additional processes are as follows:

In the flowchart 1000 as shown in FIG. 10, if it is determined that the remaining candidate resources in set $S_A$ is less than the candidate resource ratio (e.g., 20% as in LTE) in the $1^{st}$ iteration in step 1006:
if $\text{prio}_{TX}$ is LowTx,
  $\text{Th}_{a,b}$ of the resource indicated by LowTx is increased up to ThTimesLowResourceForLowTx until $20\% * M_{total}$ remaining candidate resources are satisfied in set $S_A$
  if not, $\text{Th}_{a,b}$ of the resource indicated by HighTx is increased up to ThTimesHighResourceForLowTx until $20\% * M_{total}$ remaining candidate resources are satisfied in set $S_A$
  if not, the resource is reported to the upper layer in set $S_B$.
if $\text{prio}_{TX}$ is HighTx,
  $\text{Th}_{a,b}$ of the resource indicated by LowTx is increased up to ThTimesLowResourceForHighTx until $20\% * M_{total}$ remaining candidate resources are satisfied in set $S_A$
  If not, $\text{Th}_{a,b}$ of the resource indicated by HighTx is increased up to ThTimesHighResourceForHighTx until $20\% * M_{total}$ remaining candidate resources are satisfied in set $S_A$
  if not, the resource is reported to the upper layer in set $S_B$ In various embodiments, the above flow process increases the parameter ($\text{Th}_{a,b}$ in this case) up to a first number of iterations for an exclusion process of the plurality of resource candidates from a set $S_A$, wherein the first number of iterations has a maximum number of iterations based on an at least one of the plurality of priority levels. It is then determined whether the plurality of resource candidates remaining in the set $S_A$ after the first number of iterations is less than the candidate resource ratio. When it is determined that the plurality of resource candidates remaining in the set $S_A$ after the first number of iterations is less than the candidate resource ratio, the parameter is further increased up to a second number of iterations for the exclusion process from the set $S_A$, wherein the second number of iterations has a maximum number of iterations based on the at least one of the plurality of priority levels. The plurality of resources remaining in the set $S_A$ are then moved to a set $S_B$ after the parameter is increased by the second number of iterations. The set $S_B$ is then reported to the higher layer.

In various embodiments, instead of utilising the common threshold formula $\text{Th}_{a,b}=8*a+b+1$, by assigning $\text{prio}_{TX}$ to be a and $\text{prio}_{Rx}$ to be b, numerical threshold values can also be pre-configured and/or indicated by higher level signaling for different transmission priorities, such that the parameter $\text{Th}_{a,b}$ is adjusted based on $\text{prio}_{TX}$ and $\text{prio}_{Rx}$. For example, an initial threshold value(s), intermediate threshold value(s), upper boundary value(s), etc may be indicated. It will be appreciated that other parameters besides $\text{Th}_{a,b}$ may also be adjusted by $\text{prio}_{TX}$ and $\text{prio}_{Rx}$ so as to achieve categorization using priority levels for resource selection.

In various embodiments, the increment of $\text{Th}_{a,b}$ at each iteration of the exclusion process can also be pre-configured and/or indicated by higher level signaling to be not limited to 3 dB each time.

In various embodiments, different percentage limits for the $M_{total}$ resource candidates can also be pre-configured and/or indicated by higher level signaling as restrictions for different transmission priorities, such as for example the percentage limit for HighTx may be 30%, and the percentage for LowTx may be 20% (or vice versa).

In various embodiments, different percentage segmentation for the $M_{total}$ resource candidates can also be pre-configured and/or indicated by higher level signaling as restrictions for different transmission priorities. For example, for a common percentage limit of 20% for HighTx and LowTx, the segment of [0, 10%) may be designated for HighTx, and the segment of [10%, 20%] may be designated for LowTx (or vice versa).

In various embodiments, the $\text{prio}_{TX}$ can be categorized into multiple groups and not limited to two, where the extreme case is that each priority level may be one group. The same operations as described in the flow diagrams of FIG. 8 to FIG. 10 would still apply for these multiple groups. It will be appreciated that a plurality of priority levels and/or priority groups are therefore possible for adjusting the concerned parameter.

In various embodiments, instead of categorization for $\text{prio}_{TX}$ only, the priority for received SCIs such as $\text{prio}_{RX}$ can also be utilised for the categorization of priority levels, such as for example HighRx and LowRx for $\text{prio}_{Rx}$ 0-3 and 4-7 respectively.

In various embodiments, multiple sets of resources ($S_B$) may be reported to higher layers depending on the number of categories of priorities and/or SL-RSRP thresholds.

It will be appreciated that the parameter to be adjusted based on the priority level may not necessarily be the $\text{Th}_{a,b}$. For example, the percentage limit for the $M_{total}$ resource candidates may be utilised as the adjustable parameter instead, wherein the percentage limit for HighTx may be 30%, and the percentage for LowTx may be 20% (or vice versa).

Figure 11:
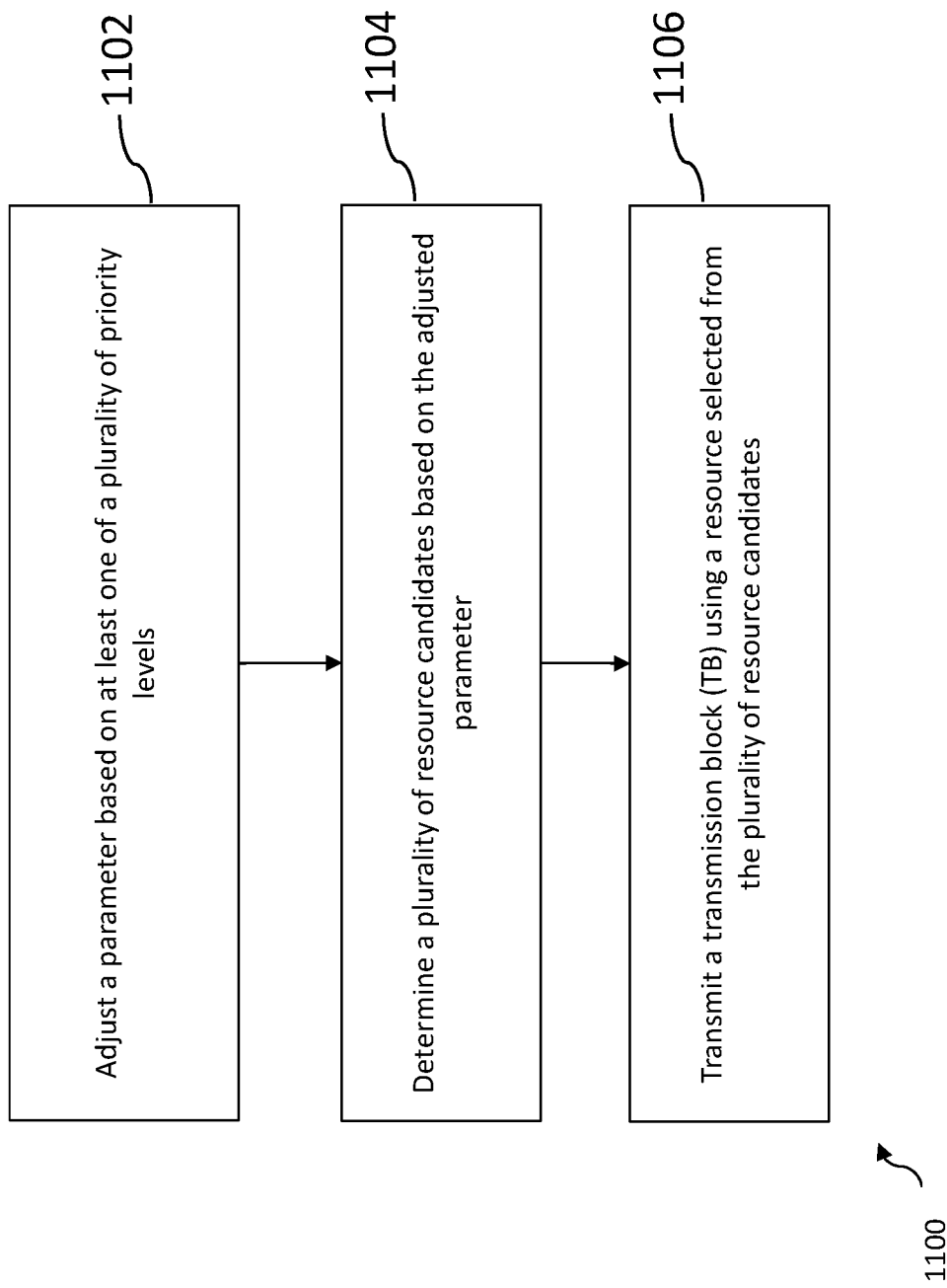
FIG. 11 shows a flow diagram 1100 illustrating a communication method according to various embodiments.

FIG. 11 shows a flow diagram 1100 illustrating a communication method according to various embodiments. In step 1102, a parameter is adjusted based on at least one of a plurality of priority levels. In step 1104, a plurality of resource candidates are determined based on the adjusted parameter. In step 1106, a TB is transmitted using a resource selected from the plurality of resource candidates.

Figure 12:
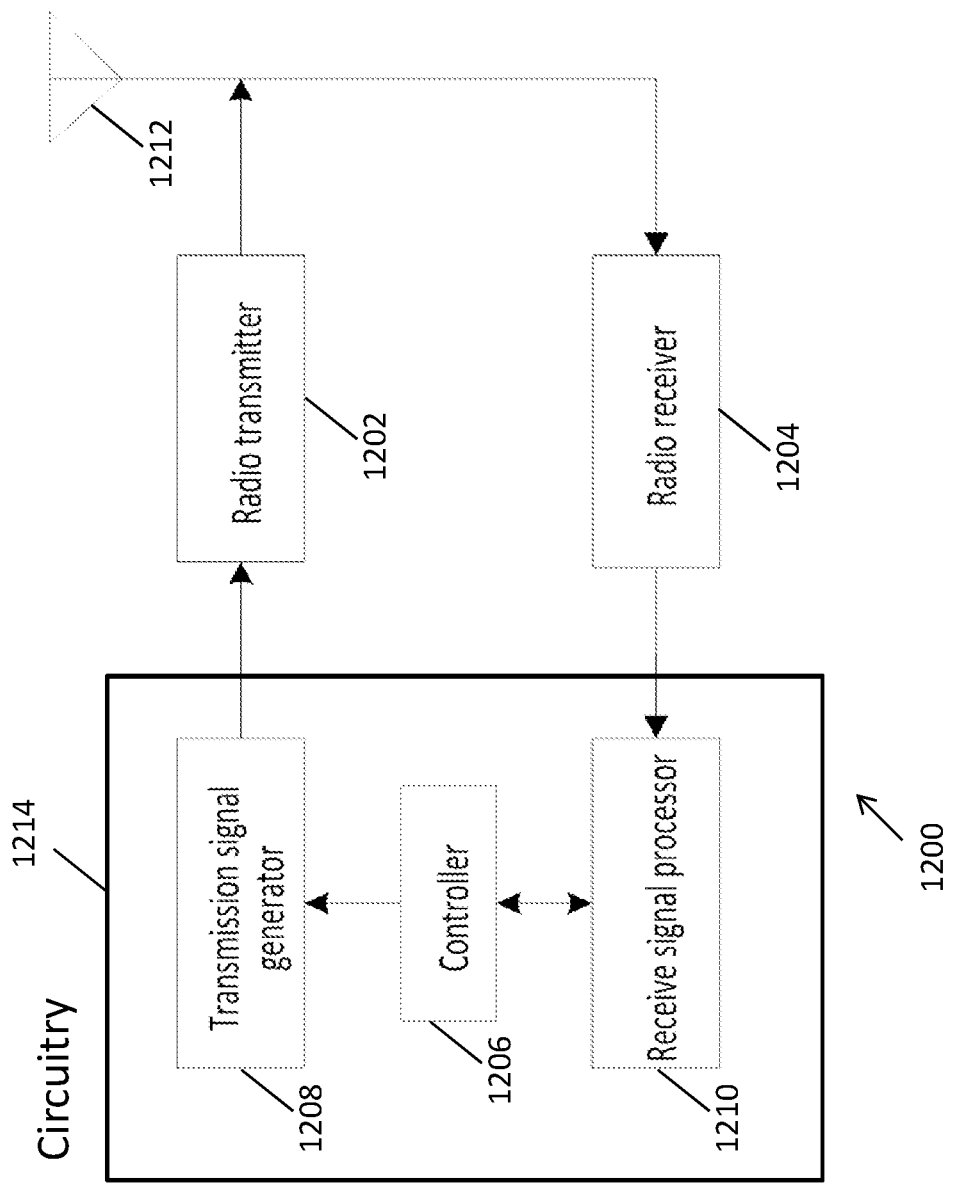
FIG. 12 shows a schematic example of communication apparatus in accordance with various embodiments. The communication apparatus may be implemented as an UE or a gNB/base station and configured for utilising SL-RSRP in accordance with various embodiments of the present disclosure.

FIG. 12 shows a schematic, partially sectioned view of the communication apparatus 1200 that can be implemented for establishing the V2X communications in accordance with various embodiments as shown in FIGS. 1 to 11. The communication apparatus 1200 may be implemented as a UE according to various embodiments.

Various functions and operations of the communication apparatus 1200 are arranged into layers in accordance with a hierarchical model. In the model, lower layers report to higher layers and receive instructions therefrom in accordance with 3GPP specifications. For the sake of simplicity, details of the hierarchical model are not discussed in the present disclosure.

As shown in FIG. 12, the communication apparatus 1200 may include circuitry 1214, at least one radio transmitter 1202, at least one radio receiver 1204, and at least one antenna 1212 (for the sake of simplicity, only one antenna is depicted in FIG. 12 for illustration purposes). The circuitry 1214 may include at least one controller 1206 for use in software and hardware aided execution of tasks that the at least one controller 1206 is designed to perform, including control of communications with one or more other communication apparatuses in a wireless network. The circuitry 1214 may furthermore include at least one transmission signal generator 1208 and at least one receive signal processor 1210. The at least one controller 1206 may control the at least one transmission signal generator 1208 for generating signals (for example, a signal containing release information relating to a reserved resource) to be sent through the at least one radio transmitter 1202 to one or more other communication apparatuses and the at least one receive signal processor 1210 for processing signals (for example, a signal containing release information relating to a reserved resource) received through the at least one radio receiver 1204 from the one or more other communication apparatuses under the control of the at least one controller 1206. The at least one transmission signal generator 1208 and the at least one receive signal processor 1210 may be stand-alone modules of the communication apparatus 1200 that communicate with the at least one controller 1206 for the above-mentioned functions, as shown in FIG. 12. Alternatively, the at least one transmission signal generator 1208 and the at least one receive signal processor 1210 may be included in the at least one controller 1206. It is appreciable to those skilled in the art that the arrangement of these functional modules is flexible and may vary depending on the practical needs and/or requirements. The data processing, storage and other relevant control apparatus can be provided on an appropriate circuit board and/or in chipsets. In various embodiments, when in operation, the at least one radio transmitter 1202, at least one radio receiver 1204, and at least one antenna 1212 may be controlled by the at least one controller 1206.

The communication apparatus 1200, when in operation, provides functions required for utilization of SL-RSRP in V2X resource sensing & selection. For example, the communication apparatus 1200 may be a UE, and the circuitry 1214 may, in operation, adjust a parameter based on at least one of a plurality of priority levels, and determine a plurality of resource candidates based on the adjusted parameter. The transmitter 1202 may, in operation, transmit a transmission block (TB) using a resource selected from the plurality of resource candidates.

The circuitry 1214 may be further configured to adjust the parameter to a maximum value relating to the at least one of the plurality of priority levels, wherein the maximum value may be indicated by a pre-configuration or a higher layer signaling.

The circuitry 1214 may be further configured to adjust the parameter to a first maximum value relating to a first priority level or a second maximum value relating to a second priority level, wherein the first and second maximum values may be indicated by a pre-configuration or a higher layer signaling.

The circuitry 1214 may be further configured to increase the parameter by a (pre-)configured value up to a maximum value of the parameter when the plurality of resource candidates meets a condition, wherein the (pre-)configured value is indicated by a pre-configuration or a higher layer signaling.

The pre-configured value may be different among the plurality of priority levels. The at least one of the plurality of priority levels may comprise a priority level of the TB. The at least one of the plurality of priority levels may be indicated by a control Information.

The plurality of priority levels may be categorised into one or more priority groups, such that each of the one or more priority groups may comprise one or more priority levels, wherein the circuitry 1214 may be further configured to adjust the parameter up to a maximum value relating to a priority group which the at least one of the plurality of priority levels is categorised. The maximum value relating to each of the one or more priority groups may be different among the priority groups.

The circuitry 1214 may be further configured to increase the parameter of the plurality of resource candidates by at most a pre-configured number of iterations for an exclusion process from a set $S_A$, the pre-configured number of iterations based on the at least one of the plurality of priority levels; move the plurality of resources remaining in the set $S_A$ after the exclusion process to a set $S_B$ after the parameter is increased by the pre-configured number of iterations; and report the set $S_B$ to the higher layer.

The circuitry 1214 may be further configured to increase the parameter up to a first number of iterations for an exclusion process of the plurality of resource candidates from a set $S_A$, the first number of iterations having a maximum number of iterations based on the at least one priority level; determine whether the plurality of resource candidates remaining in the set $S_A$ after the first number of iterations is less than a candidate resource ratio; further increase the parameter up to a second number of iterations for the exclusion process from the set $S_A$ when it is determined that the plurality of resource candidates remaining in the set $S_A$ after the first number of iterations is less than the candidate resource ratio, the second number of iterations having a maximum number of iterations based on the at least one priority level; move the plurality of resources remaining in the set $S_A$ to a set $S_B$ after the parameter is increased by the second number of iterations; and report the set $S_B$ to a higher layer.

The candidate resource ratio may be configured to be a percentage value different from 20%. The parameter may comprise a $Th_{a,b}$. The circuitry 1214 may be further configured to increase the $Th_{a,b}$ in each iteration of an exclusion process by a value different from 3 dB.

As described above, the embodiments of the present disclosure provide an advanced communication system, communication methods and communication apparatuses for utilization of SL-RSRP in V2X resource sensing & selection that advantageously prevents transmissions with low priority from impeding transmissions with high priority.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

It will be understood that while some properties of the various embodiments have been described with reference to a device, corresponding properties also apply to the methods of various embodiments, and vice versa.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects illustrative and not restrictive.

The invention claimed is:

1. A communication apparatus comprising:
   circuitry which, in operation, adjusts a parameter relating to a number of resource candidates based on at least one of a plurality of priority levels, and determines a first plurality of resource candidates based on a threshold of Reference Signal Received Power (RSRP), and determines a second plurality of resource candidates from among the first plurality of resource candidates based on the adjusted parameter; and
   a transmitter which, in operation, transmits a transmission block (TB) using a resource selected from the second plurality of resource candidates.

2. The communication apparatus according to claim 1, wherein the circuitry, in operation, adjusts the parameter to a maximum value relating to the at least one of the plurality of priority levels, wherein the maximum value is indicated by a pre-configuration or a higher layer signaling.

3. The communication apparatus according to claim 1, wherein the circuitry, in operation, adjusts the parameter to a first maximum value relating to a first priority level or a second maximum value relating to a second priority level, wherein the first and second maximum values are indicated by a pre-configuration or a higher layer signaling.

4. The communication apparatus according to claim 1, wherein the circuitry, in operation, increases the parameter by a (pre-) configured value up to a maximum value of the parameter when the second plurality of resource candidates meets a condition, wherein the (pre-) configured value is indicated by a pre-configuration or a higher layer signaling.

5. The communication apparatus according to claim 4, wherein the pre-configured value is different among the plurality of priority levels.

6. The communication apparatus according to claim 1, wherein the at least one of the plurality of priority levels comprises a priority level of the TB.

7. The communication apparatus according to claim 1, wherein the at least one of the plurality of priority levels is indicated by a control Information.

8. The communication apparatus according to claim 1,
   wherein the plurality of priority levels are categorized into one or more priority groups, and each of the one or more priority groups comprises one or more priority levels, and
   wherein the circuitry, in operation, adjusts the parameter up to a maximum value relating to a priority group which the at least one of the plurality of priority levels is categorized.

9. The communication apparatus according to claim 8, wherein the maximum value relating to each of the one or more priority groups are different among the priority groups.

10. The communication apparatus according to claim 1, wherein the circuitry, in operation:
    increases the parameter of the second plurality of resource candidates by at most a pre-configured number of iterations for an exclusion process from a set $S_A$, the pre-configured number of iterations based on the at least one of the plurality of priority levels;
    move the plurality of resources remaining in the set $S_A$ after the exclusion process to a set $S_B$ after the parameter is increased by the pre-configured number of iterations; and
    report the set $S_B$ to the higher layer.

11. The communication apparatus according to claim 1, wherein the circuitry is further configured to:
    increase the parameter up to a first number of iterations for an exclusion process of the second plurality of resource candidates from a set $S_A$, the first number of iterations having a maximum number of iterations based on the at least one of the plurality of priority levels;
    determine whether the second plurality of resource candidates remaining in the set $S_A$ after the first number of iterations is less than a candidate resource ratio;
    further increase the parameter up to a second number of iterations for the exclusion process from the set $S_A$ when it is determined that the second plurality of resource candidates remaining in the set $S_A$ after the first number of iterations is less than the candidate resource ratio, the second number of iterations having a maximum number of iterations based on the at least one of the plurality of priority levels;
    move the plurality of resources remaining in the set $S_A$ to a set $S_B$ after the parameter is increased by the second number of iterations; and
    report the set $S_B$ to a higher layer.

12. The communication apparatus according to claim 11, wherein the candidate resource ratio is configured to be a percentage value different from 20%.

13. The communication apparatus according to claim 1, wherein the parameter comprises a $Th_{a,b}$.

14. The communication apparatus according to claim 1, wherein the parameter comprises a $Th_{a,b}$ and wherein the circuitry is further configured to increase the $Th_{a,b}$ in each iteration of an exclusion process by a value different from 3 dB.

15. A communication method comprising:
adjusting a parameter relating to a number of resource candidates based on at least one of a plurality of priority levels;
determining a first plurality of resource candidates based on a threshold of Reference Signal Received Power (RSRP), and determines a second plurality of resource candidates from among the first plurality of resource candidates based on the adjusted parameter; and
transmitting a transmission block (tb) using a resource selected from the second plurality of resource candidates.

* * * * *